UNITED STATES PATENT OFFICE.

FRED E. KLING, OF YOUNGSTOWN, OHIO, ASSIGNOR OF ONE-HALF TO LUTHER B. WEIDLEIN.

FILTERING MEDIUM FOR CLEANING FURNACE-GASES.

1,215,385. Specification of Letters Patent. Patented Feb. 13, 1917.

No Drawing. Application filed December 11, 1915. Serial No. 66,354.

*To all whom it may concern:*

Be it known that I, FRED E. KLING, a citizen of the United States, residing at Youngstown, in the county of Mahoning and State of Ohio, have invented certain new and useful Improvements in Filtering Mediums for Cleaning Furnace-Gases, of which the following is a specification.

This invention relates to an improvement in the means for separating dust from furnace gases, particularly the dust carried by the gases resulting from the operation of blast furnaces.

To that end, the invention has for its primary object a new and efficient filtering medium possessing the desirable property of obtaining what may be termed a superfine extraction of dust from furnace gases, whereby the latter will be given a maximum efficiency for subsequent use for heating or power purposes.

As is well known, the gas issuing from blast furnaces is impregnated to a considerable degree with a fine metallic dust, consisting principally of particles of ore, coke, and limestone, and this dust must be substantially eliminated from the gas in order that the latter may be utilized for fuel or power purposes, without objectionable results. Unless thoroughly cleaned of this mineral dust carried therewith from the blast furnace, the efficiency of the gas is greatly impaired, and when burning such gas, impregnated with the dust, in hot blast stoves and under boilers, the dust sinters and forms slag, which clogs the passages of the stoves and boilers, and also collects on the boiler tubes, thereby seriously retarding the conduction of heat to the water.

Accordingly, various efforts have heretofore been made to remove the dust from furnace gases to a sufficient extent to obviate the usual objection to the use of the gas as a fuel, but the methods ordinarily employed for this purpose have either required a high operating expense or have impaired the efficiency of the gas, more particularly by decreasing the temperature thereof.

The most usual method of cleaning furnace gas is by conducting the same through suitable " dust catchers ", and sometimes also to a " gas washer ". Furthermore, in cases where it is desired to use the gas for power purposes as in gas engines, the cleaning steps are carried through further expensive operations until a superfine extraction of the dust has been obtained.

In any process of separating dust from furnace gases, an important and practical consideration is to maintain the high temperature of the gas, to conserve its maximum of efficiency, but heretofore this has been difficult especially in cleaning operations involving the use of water which inevitably greatly decreases the temperature conditions. Therefore, one of the important objects achieved by the present invention is to not only provide a more thorough and complete separation of the dust from the gas, than has heretofore been possible, but also to maintain the gas at its high temperature during the cleaning process.

In order to accomplish the results indicated, the present invention entirely obviates the use of a gas washer, and other expensive operations by utilizing as a medium of separation a substance having peculiarly effective characteristics when interposed in the line of the dust impregnated gas conducted from the blast furnace. The substance referred to is a metal wool known as " steel wool ". This consists of very fine threads or fibers of steel, usually loosely matted so that the mass of steel fibers or threads are intertwisted and interlocked in a manner like the cotton fibers in a bat of cotton. However, for the purposes of the present invention, this body of steel wool, through which the dust impregnated gas passes, may be either in woven or unwoven form, because the cardinal feature of the invention resides in passing the furnace gases, at any convenient point in their travel from the furnace, through a strata or diaphragm of steel fibers or threads, usually in the form known as the steel wool referred to.

It has been found that when the dust-laden gases are passed through a strata of steel fibers or steel wool a remarkably complete and superfine extraction of the dust from the gas takes place. A very pronounced affinity exists between the steel and the dust, resulting in the mineral dust closely attaching itself to the steel with such tenacity that a very effective separating action is attained. This is aided by the heated condition of the wool, and such condition of the wool in turn maintains the temperature of the gas which is a desirable feature as above explained.

Any suitable forms of apparatus may be utilized in connection with the herein described filtering medium, but a preferable means of carrying the same into effect is to place the strata or diaphragm of steel wool across the passageway of a pipe or chamber leading from a suitable dust catcher.

I claim:

1. A filtering medium for mechanically extracting dust from hot furnace gases consisting of a matted body of steel threads.

2. A filtering medium for mechanically extracting dust from hot furnace gases consisting of a body of steel wool.

In testimony whereof I hereunto affix my signature in the presence of two witnesses.

FRED E. KLING.

Witnesses:
H. H. WICKHAM,
DEAN ZIMMERMANN.